(12) United States Patent
Wang (10) Patent No.: US 10,259,107 B2
(45) Date of Patent: Apr. 16, 2019

(54) DRIVING ROD ASSEMBLY FOR POWER TOOL

(71) Applicant: Compass Corporation, Tainan (TW)

(72) Inventor: Tzu-Chien Wang, Tainan (TW)

(73) Assignee: Compass Corporation, Tainan (TW)

( * ) Notice: Subject to any disclaimer, the term of this patent is extended or adjusted under 35 U.S.C. 154(b) by 0 days.

(21) Appl. No.: 15/680,375

(22) Filed: Aug. 18, 2017

(65) Prior Publication Data

US 2019/0054601 A1 Feb. 21, 2019

(51) Int. Cl.
| | | |
|---|---|---|
| *B23B 31/107* | (2006.01) | |
| *B25B 23/00* | (2006.01) | |
| *B25B 23/12* | (2006.01) | |

(52) U.S. Cl.
CPC ...... *B25B 23/0035* (2013.01); *B23B 31/1071* (2013.01); *B25B 23/12* (2013.01)

(58) Field of Classification Search
CPC ...... B23B 31/1071; Y10T 408/95; B25F 3/00; B25B 23/0035; B25B 21/007
See application file for complete search history.

(56) References Cited

U.S. PATENT DOCUMENTS

| | | | | |
|---|---|---|---|---|
| 2,718,806 A * | 9/1955 | Clark | ...................... | B25B 23/12 403/DIG. 1 |
| 3,336,611 A * | 8/1967 | Schepp | ................. | B25B 21/007 408/202 |
| 5,752,418 A * | 5/1998 | Robins | ................... | B25B 15/001 81/177.2 |
| 8,695,461 B2 * | 4/2014 | Moss | ...................... | B25B 13/06 81/125 |
| 9,981,366 B2 * | 5/2018 | Todd | ................... | B25B 23/0035 |
| 2003/0131694 A1 * | 7/2003 | Lin | ........................ | B25B 15/001 81/438 |
| 2009/0085308 A1 * | 4/2009 | Chiang | ................. | B25B 15/001 279/102 |
| 2015/0143965 A1 * | 5/2015 | Yang | ..................... | B25B 15/008 81/437 |
| 2018/0111254 A1 * | 4/2018 | Huang | ................ | B25B 23/0035 |

* cited by examiner

*Primary Examiner* — Daniel W Howell
*Assistant Examiner* — Paul M Janeski
(74) *Attorney, Agent, or Firm* — Alan D. Kamrath; Kamrath IP Lawfirm, P.A.

(57) ABSTRACT

A driving rod assembly includes a rod having an insertion section for coupling with a rotating head of a power tool and an operative section for coupling with an external tool. The rod further includes an outer periphery having first and second positioning grooves and a positioning portion between the first and second positioning grooves. The operative section includes a coupling portion located in front of the second positioning groove and having a stopper edge wider than the positioning portion. A coupling end is provided at a front end of the operative section. A C-clip is mounted on the positioning portion of the rod. A jacket includes a receiving section slideably mounted around the positioning portion. The jacket further includes a coupling section located mounted around the coupling portion of the rod to rotate together with the rod. The receiving section includes a coupling groove for receiving the C-clip.

7 Claims, 8 Drawing Sheets

DRIVING ROD ASSEMBLY FOR POWER TOOL

BACKGROUND OF THE INVENTION

The present invention relates to a driving rod assembly for a power tool and, more particularly, to a driving rod assembly that can be coupled with a sleeve or a screwdriver bit while providing better assembling stability and use safety.

Conventional electric or pneumatic power tools generally include a rotating head for coupling with a driving rod. The driving rod can be driven by the rotating head to rotate a bolt. Alternatively, the driving rod can have a specific structure for coupling with a sleeve or a screwdriver bit.

However, driving rods of different structures are required for coupling with sleeves or screwdriver bits for different works, and troublesome operation occurs in replacing the driving rod on the rotating head with another driving rod of a different structure for a different work, which is inconvenient to use.

To solve the above disadvantage, a sleeve or an extension rod is added to a front end of the driving rod for the purposes of eliminating troublesome replacement operation for removing the driving rod from the rotating head of the power tool.

However, the power tool is generally used in a high-speed condition, such that the sleeve or the extension rod might disengage from the driving rod at high speed due to the rotational force, leading to danger during use.

Additionally, when the torque during the operation excesses the strength of the driving rod, the driving rod is liable to shatter, and a worker nearby could be injured by the scattered fragments of the driving rod.

BRIEF SUMMARY OF THE INVENTION

An objective of the present invention is to provide a driving rod assembly that can be coupled with a sleeve or a screwdriver bit while providing better assembling stability and use safety.

A driving rod assembly for a power tool according to the present invention includes a rod, a C-clip, and a jacket. The rod includes a rear end having an insertion section configured for coupling with a rotating head of a power tool and an operative section in front of the insertion section along a longitudinal axis. The rod further includes an outer periphery having a first positioning groove in a rear end of the operative section. The outer periphery of the rod further includes a second positioning groove in front of the first positioning groove in the longitudinal direction. A positioning portion is located between the first positioning groove and the second positioning groove. The operative section includes a coupling portion in front of the second positioning groove along the longitudinal axis. The coupling portion includes non-circular cross sections. The coupling portion includes a rear end having a stopper edge with a width perpendicular to the longitudinal axis greater than a width of the positioning portion perpendicular to the longitudinal axis. The rod further includes a coupling end at a front end of the operative section. The C-clip is mounted on the positioning portion of the rod. The jacket includes a rear end having a receiving section slideably mounted around the positioning portion of the rod. The jacket further includes a coupling section located in front of the receiving section and mounted around the coupling portion of the rod. The coupling section of the jacket and the coupling portion of the rod are jointly rotatable about the longitudinal axis. The receiving section includes an inner periphery having a coupling groove for receiving a portion of the C-clip. The coupling section includes a front end having a receiving hole configured to couple with an external tool.

The C-clip is received in the first positioning groove of the rod. The jacket is mounted around the rod. The coupling groove of the jacket is coupled with the C-clip, such that the C-clip is jointly movable with the jacket between a front position and a rear position along the longitudinal axis, and such that the jacket is prevented from disengaging from the rod. When the jacket is moved rearward to the rear position, the C-clip engages with the first coupling groove, and the coupling end of the rod is located outside of the jacket. When the jacket is moved forward to the front position, the C-clip engages with the second coupling groove, the receiving hole of the jacket is located outside of the rod, and the stopper edge abuts the C-clip to prevent the jacket in the front position from moving forward along the longitudinal axis.

In an example, the first positioning groove includes a front side having a first inclined guiding face inclining forward. The first positioning groove further includes a rear side having a first stopper face perpendicular to the longitudinal axis. The second positioning groove includes a rear side having a second inclined guiding face inclining rearward.

In an example, the rod further includes a flange between the first coupling groove and the insertion section. The flange has a diameter larger than a diameter of the operative section. The rear end of the jacket abuts the flange when the C-clip is in the rear position and is located in the first positioning groove.

In an example, each of the first positioning groove and the second positioning groove of the rod includes a bottom wall having a diameter smaller than a diameter of the operative section of the rod. When the torque resulting from rotation of the driving rod assembly exceeds a preset value, the rod breaks at the first positioning groove or the second positioning groove to prevent the rod from shattering into shards, providing improved use safety. Furthermore, the jacket will not disengage from the rod after assembly to prevent the jacket from momentarily falling off during the rotational work, providing improved use safety and reliably.

In an example, the jacket further includes a third inclined guiding face extending from behind the coupling groove to the rear end of the receiving section and having increasing diameters toward the rear end of the receiving section.

In an example, the coupling portion of the rod includes a first receptacle extending in a radial direction perpendicular to the longitudinal axis and a second receptacle extending in a radial direction perpendicular to the longitudinal axis. The second receptacle is located between the first receptacle and the coupling end along the longitudinal axis. Each of the first and second receptacles receives a ball and a spring biasing the ball to partially protrude out of a corresponding one of the first receptacle and the second receptacle.

In an example, the inner periphery of the coupling section of the jacket includes a guiding groove extending along the longitudinal axis. The guiding groove of the jacket slideably abuts the balls when the jacket moves relative to the rod along the longitudinal axis. The spring-biased balls elastically press against an inner periphery of the guiding groove to provide a stable coupling effect between the jacket and the rod.

In an example, the coupling end of the rod has a diameter smaller than a diameter of the coupling portion of the rod. A magnetic element is mounted in the coupling end.

In an example, the positioning portion of the rod is cylindrical.

The present invention will become clearer in light of the following detailed description of illustrative embodiments of this invention described in connection with the drawings.

DETAILED DESCRIPTION OF THE INVENTION

Figure 1:
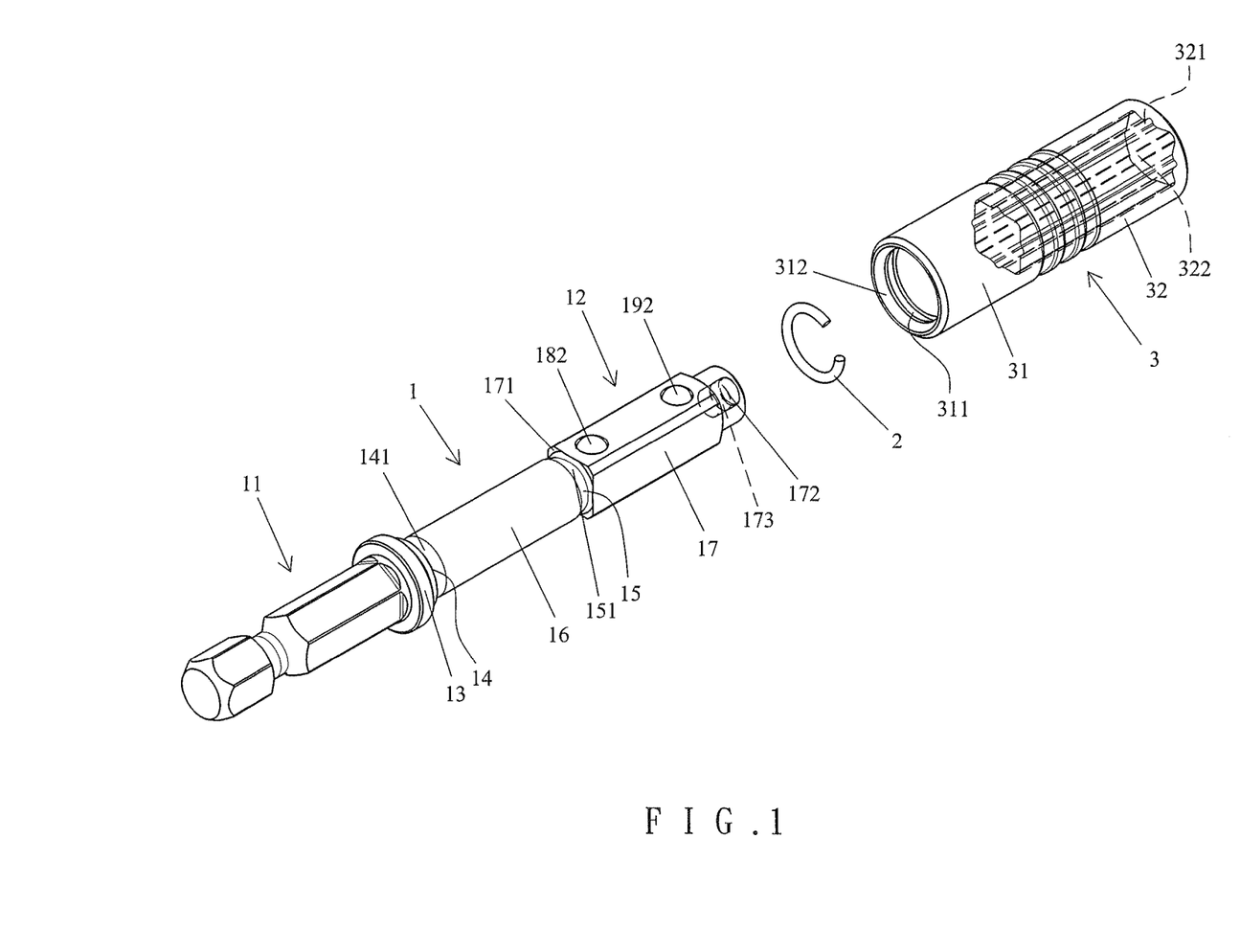
FIG. 1 is an exploded, perspective view of a driving rod assembly according to the present invention.
Figures 2, 2A:
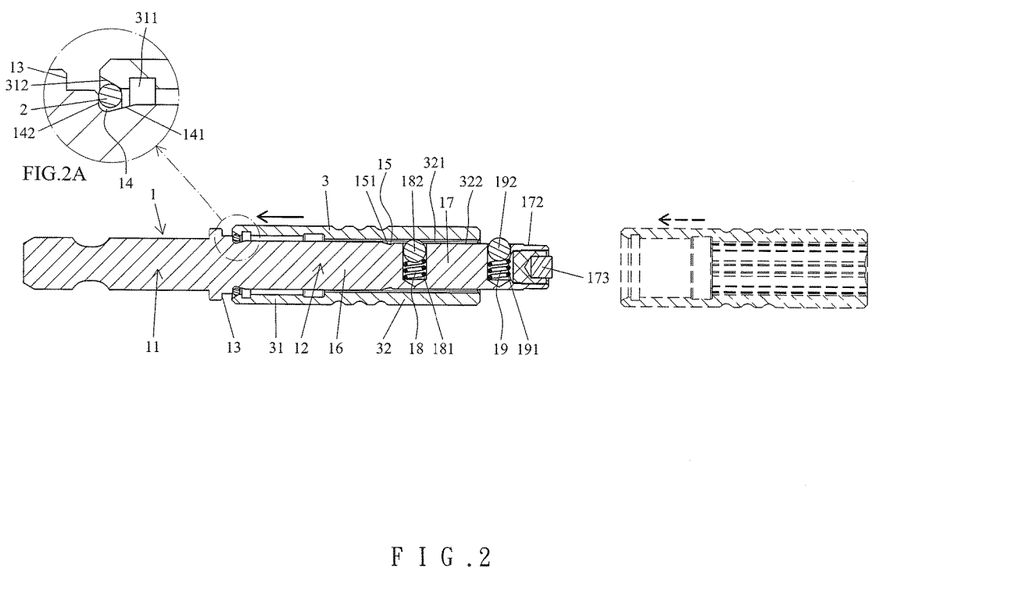
FIG. 2 is a longitudinal cross-sectional view of the rod of FIG. 1, illustrating assembly of a jacket with a C-clip on a rod.
FIG. 2A is an enlarged view of a circled portion of FIG. 2.

With reference to FIGS. 1 and 2, a driving rod assembly for a power tool of an embodiment according to the present invention includes a rod 1, a C-clip 2, and a jacket 3. The rod 1 is elongated and includes a rear end having an insertion section 11 configured for coupling with a rotating head 4 of a power tool (see FIG. 5) and an operative section 12 in front of the insertion section 11 along a longitudinal axis. The rod 1 further includes a flange 13 between a rear end of the operative section 12 and the insertion section 11. The flange 13 has a diameter larger than a diameter of the operative section 12. The rod 1 further includes an outer periphery having a first positioning groove 14 in the rear end of the operative section 12 and in front of the flange 13. The first positioning groove 14 includes a front side having a first inclined guiding face 141 inclining forward. The first positioning groove 14 further includes a rear side having a first stopper face 142 perpendicular to the longitudinal axis.

The outer periphery of the rod 1 further includes a second positioning groove 15 in front of the first positioning groove 14 in the longitudinal direction. The second positioning groove 15 includes a rear side having a second inclined guiding face 151 inclining rearward. A positioning portion 16 is located between the first positioning groove 14 and the second positioning groove 15 and is cylindrical.

The operative section 12 further includes a coupling portion 17 having non-circular cross sections (such as square cross sections) in front of the second positioning groove 15 along the longitudinal axis. The coupling portion 17 includes a rear end having a stopper edge 171 with a width perpendicular to the longitudinal axis greater than a width of the positioning portion 16 perpendicular to the longitudinal axis. The coupling portion 17 of the rod 1 includes a first receptacle 18 extending in a radial direction perpendicular to the longitudinal axis and a second receptacle 19 extending in a radial direction perpendicular to the longitudinal axis. Each of the first and second receptacles 18 and 19 receives a ball 182, 192 and a spring 181, 191 biasing the ball 182, 192 to partially protrude out of a corresponding one of the first receptacle 18 and the second receptacle 19.

The rod 1 further includes a coupling end 172 located at a front end of the coupling portion 17 of the rod 1 and having a diameter smaller than a diameter of the coupling portion 17. The second receptacle 19 is located between the first receptacle 18 and the coupling end 172 along the longitudinal axis. A magnetic element 173 is mounted in the coupling end 172. A coil spring (not shown) can be mounted behind the magnetic element 173 for use with various screws with different lengths.

A C-clip 2 is mounted on the positioning portion 16 of the rod 1 and is jointly movable with the jacket 3. The jacket 3 includes a rear end having a receiving section 31 slideably mounted around the positioning portion 16 of the rod 1. The jacket 3 further includes a coupling section 32 located in front of the receiving section 31 and mounted around the coupling portion 17 of the rod 1. The coupling section 32 of the jacket 3 and the coupling portion 17 of the rod 1 are jointly rotatable about the longitudinal axis. An inner periphery of the coupling section 32 has a shape corresponding to a shape of the coupling portion 17 of the rod 1. The inner periphery of the receiving section 31 includes a coupling groove 311 for receiving a portion of the C-clip 2. The jacket 3 further includes a third inclined guiding face 312 extending from behind the coupling groove 311 to the rear end of the receiving section 31 and having increasing diameters toward the rear end of the receiving section 31. The inner periphery of the coupling section 32 of the jacket 3 includes a guiding groove 321 extending along the longitudinal axis and slideably abutting the balls 182 and 192. Furthermore, a front end of the coupling section 32 includes a receiving hole 322 configured to couple with an external tool.

Figures 3, 3A:
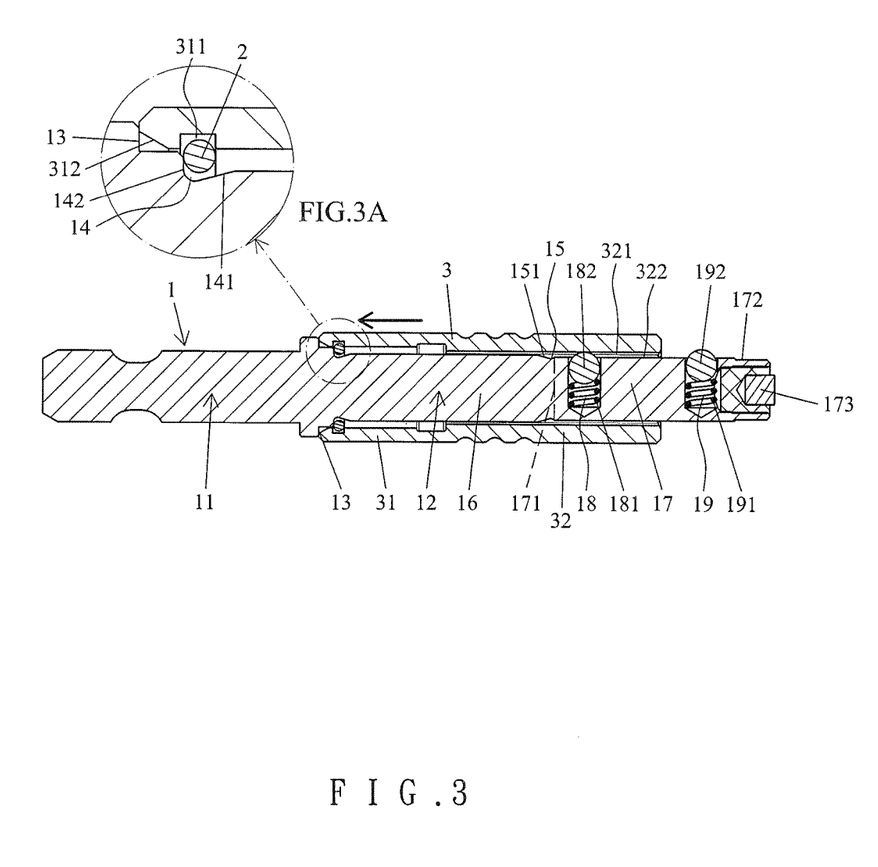
FIG. 3 is a view similar to FIG. 2, with the jacket moved to a rear position on the rod.
FIG. 3A is an enlarged view of a circled portion of FIG. 3.

With reference to FIG. 2, in assembly, the C-clip 2 is mounted in the first positioning groove 14 of the rod 1, and the jacket 3 is mounted around the rod 1. With reference to FIG. 3, an external force is applied to move the jacket 3 rearward along the rod 1 to a rear position, such that the coupling groove 311 at the rear end of the jacket 3 couples with the C-clip 2. The third inclined guiding face 312 on the rear end of the jacket 3 easily guides the C-clip 2 into the coupling groove 311 for joint movement with the jacket 3. Thus, the C-clip 2 is jointly movable with the jacket 3 between a front position and the rear position along the longitudinal axis, and a portion of the C-clip 2 protrudes outside of the coupling groove 311.

Figure 4:
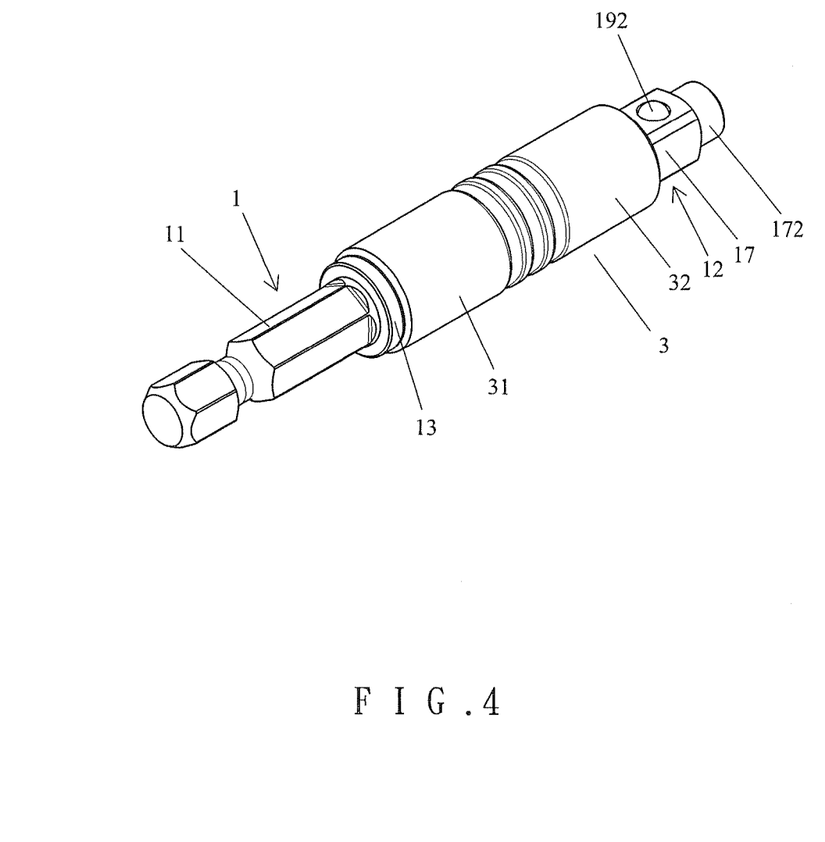
FIG. 4 is a perspective view of the rod of FIG. 3.
Figures 5, 5A:
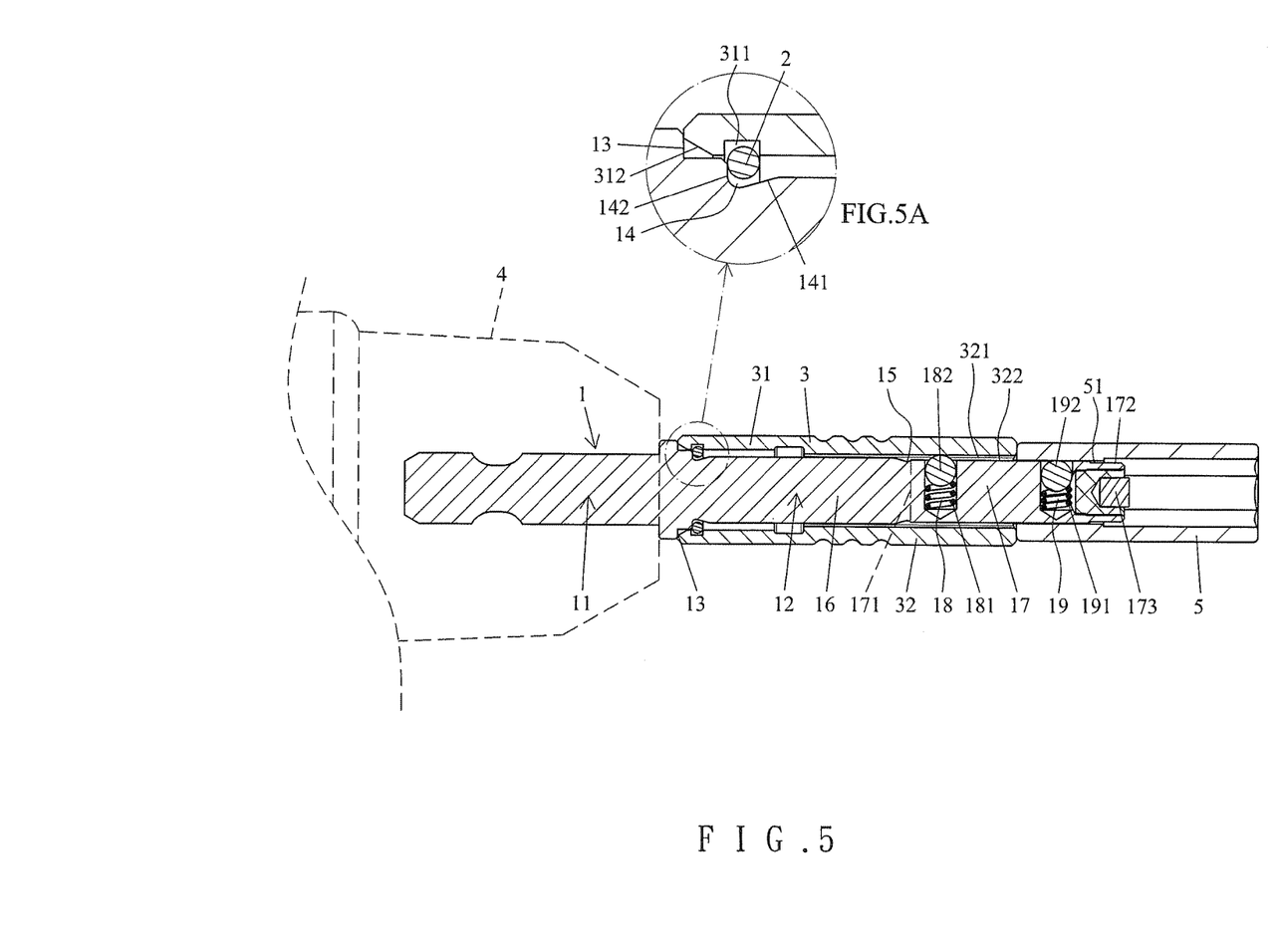
FIG. 5 is a view similar to FIG. 3, with an insertion section of the rod coupled with a rotating head and with a front end of the rod coupled with an external sleeve.
FIG. 5A is an enlarged view of a circled portion of FIG. 5.

With reference to FIGS. 4, 5, when the C-clip 2 engages with the first positioning groove 14, the rear portion of the jacket 3 is around the positioning portion 16, and the coupling end 172 of the rod 1 and the ball 192 in the second receptacle 19 are located outside of the jacket 3. Furthermore, the front end of the operative section 12 can be coupled with a sleeve hole 51 of an external sleeve 5, and the spring-biased ball 192 elastically presses against an inner periphery of the sleeve hole 51. The jacket 3 is moved to the rear position, and the rear end of the jacket 3 abuts the flange 13. Furthermore, the spring-biased ball 182 in the first receptacle 18 elastically presses against the inner periphery of the coupling section 32 to provide a better positioning effect. Furthermore, the first stopper face 142 of the first positioning groove 14 reliably abuts the C-clip 2 to avoid the C-clip 2 from moving rearward and disengaging from the first positioning groove 14.

Figure 6:
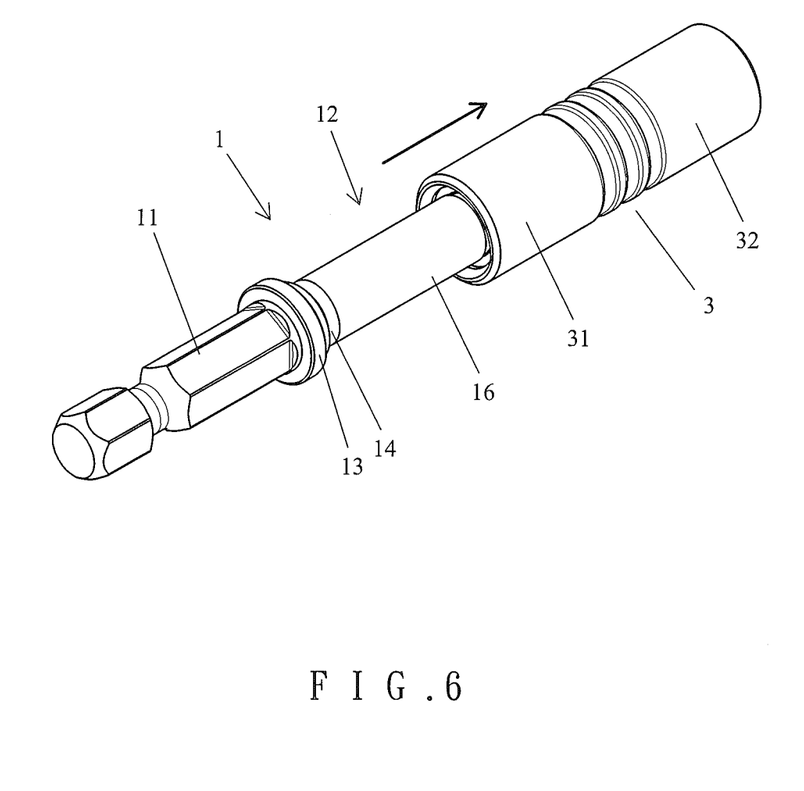
FIG. 6 is a perspective view similar to FIG. 4, with the jacket moved to a front position on the rod.
Figure 7:
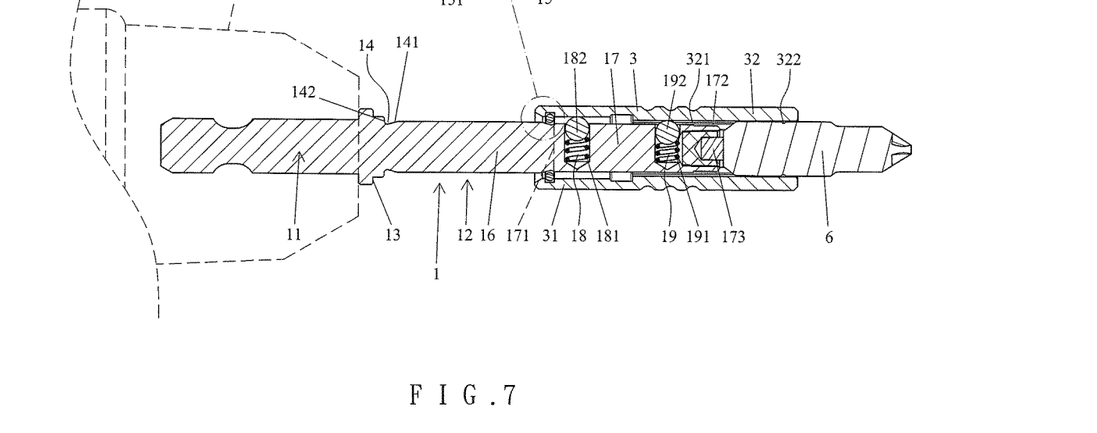
FIG. 7 is a longitudinal cross-sectional view of the rod of FIG. 6, with the insertion section of the rod coupled with the rotating head and with a bit coupled with a front end of the rod.
Figure 7A:
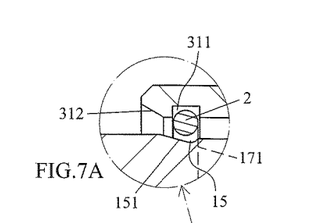
FIG. 7A is an enlarged view of a circled portion of FIG. 7.

With reference to FIGS. 6-7, the jacket 3 can be moved forward to the front position together with the C-clip 2 to engage the C-clip 2 with the second positioning groove 15. The receiving hole 322 of the jacket 3 is located outside of the rod 1 and can couple with a bit 6. During the sliding movement of the jacket 3, the C-clip 2 is easily guided out of the first positioning groove 14 via the first inclined guiding face 141 and is easily guided into the second positioning groove 15 via the second inclined guiding face 151. Furthermore, the stopper edge 171 at the rear end of the coupling portion 17 of the rod 1 abuts the C-clip 2 to prevent the jacket 3 in the front position from moving further forward along the longitudinal axis. The balls 182 and 192 elastically press against the inner periphery of the coupling section 32 of the jacket 3 to provide a better positioning effect.

Figure 8:
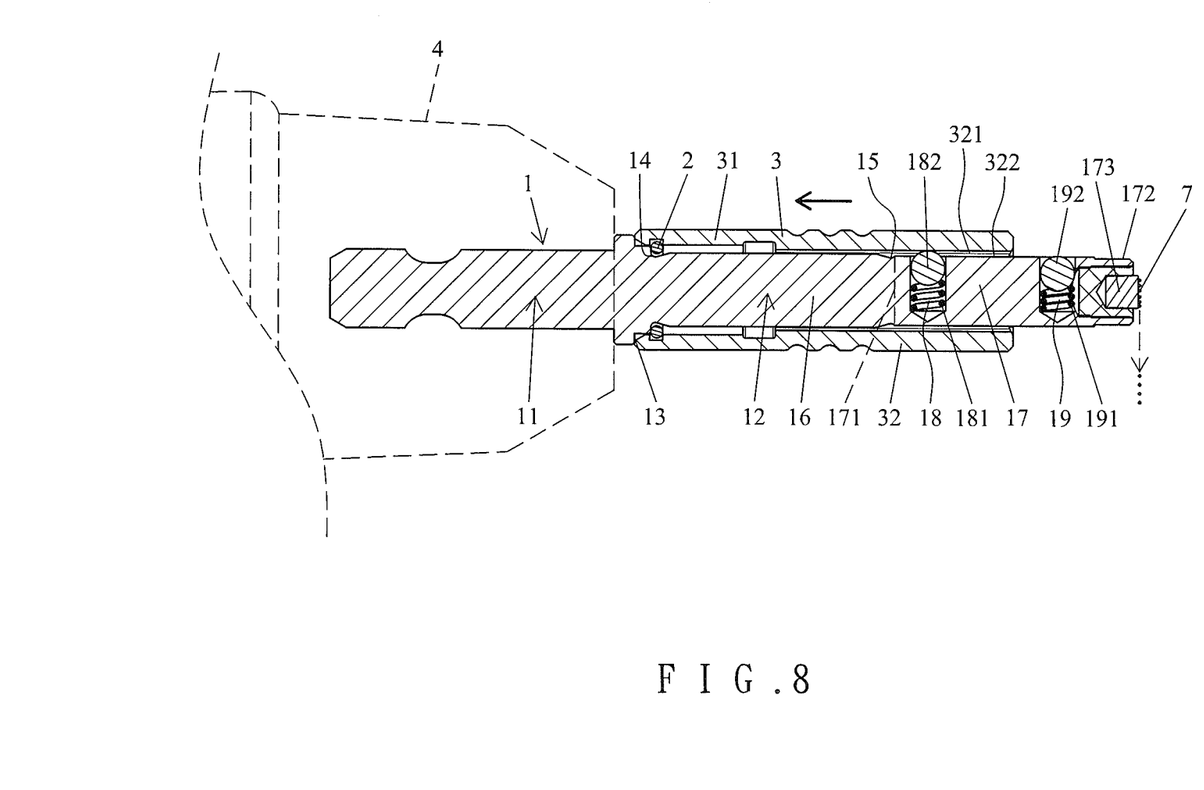
FIG. 8 is a view similar to FIG. 7, with the jacket moved to the rear position to remove iron scraps on an outer surface of a magnetic member.

With reference to FIGS. 7 and 8, the jacket 3 and the C-clip 2 can be moved to the rear position in which the C-clip 2 engages with the first positioning groove 14. The C-clip 2 can easily be guided out of the second positioning groove 15 via the second inclined guiding face 151, providing movement convenience. After use, iron scraps 7 on the bit 6 or a screw (not shown) could be attracted to the magnetic element 173. In this case, the jacket 3 can be moved to the rear position to permit easy removal of the iron scraps 7 from the magnetic element 173, improving operational stability of the magnetic element 173 attracting the bit 6 or a screw.

In this embodiment, each of the first positioning groove 14 and the second positioning groove 15 of the rod 1 includes a bottom wall having a diameter smaller than a diameter of the operative section 12 of the rod 1. When the driving rod assembly operates and generates a torque, the stress concentrates at the operative section 12 of the rod 1. The first and second positioning grooves 14 and 15 distribute the stress to prolong the service life. When the torque exceeds a preset value, the rod 1 breaks at the first positioning groove 14 or the second positioning groove 15 to prevent the rod 1 from shattering into shards, providing improved use safety. Furthermore, the jacket 3 will not disengage from the rod 1 after assembly to prevent the jacket 3 from momentarily falling off during the rotational work, providing improved use safety and reliably.

Although specific embodiments have been illustrated and described, numerous modifications and variations are still possible without departing from the scope of the invention. The scope of the invention is limited by the accompanying claims.

The invention claimed is:

1. A driving rod assembly for a power tool, comprising:
a rod including a rear end having an insertion section configured for coupling with a rotating head of a power tool and an operative section in front of the insertion section along a longitudinal axis, wherein the rod further includes an outer periphery having a first positioning groove in a rear end of the operative section, wherein the outer periphery of the rod further includes a second positioning groove in front of the first positioning groove in the longitudinal direction, wherein a positioning portion is located between the first positioning groove and the second positioning groove, wherein the operative section includes a coupling portion in front of the second positioning groove along the longitudinal axis, wherein the coupling portion includes non-circular cross sections, wherein the coupling portion includes a rear end having a stopper edge with a width perpendicular to the longitudinal axis greater than a width of the positioning portion perpendicular to the longitudinal axis, wherein the rod further includes a coupling end at a front end of the operative section, wherein the coupling portion of the rod includes a first receptacle extending in a radial direction perpendicular to the longitudinal axis and a second receptacle extending in a radial direction perpendicular to the longitudinal axis, wherein the second receptacle is located between the first receptacle and the coupling end along the longitudinal axis, and wherein each of the first and second receptacles receives a ball and a spring biasing the ball to partially protrude out of a corresponding one of the first receptacle and the second receptacle;
a C-clip mounted on the positioning portion of the rod; and
a jacket including a rear end having a receiving section slideably mounted around the positioning portion of the rod, wherein the jacket further includes a coupling section located in front of the receiving section and mounted around the coupling portion of the rod, wherein the coupling section of the jacket and the coupling portion of the rod are jointly rotatable about the longitudinal axis, wherein the receiving section includes an inner periphery having a coupling groove for receiving a portion of the C-clip, wherein the coupling section includes a front end having a receiving hole configured to couple with an external tool, wherein the inner periphery of the coupling section of the jacket includes a guiding groove extending along the longitudinal axis, wherein the guiding groove of the jacket slideably abuts the balls when the jacket moves relative to the rod along the longitudinal axis, wherein the C-clip is received in the first positioning groove of the rod, the jacket is mounted around the rod, the coupling groove of the jacket is coupled with the C-clip, such that the C-clip is jointly movable with the jacket between a front position and a rear position along the longitudinal axis and that the jacket is prevented from disengaging from the rod, wherein when the jacket is moved rearward to the rear position, the C-clip engages with the first coupling groove, and the coupling end of the rod is located outside of the jacket, and wherein when the jacket is moved forward to the front position, the C-clip engages with the second coupling groove, the receiving hole of the jacket is located outside of the rod, and the stopper edge abuts the C-clip to prevent the jacket in the front position from moving forward along the longitudinal axis.

2. The driving rod assembly for a power tool as claimed in claim 1, wherein the first positioning groove includes a front side having a first inclined guiding face inclining forward, wherein the first positioning groove further includes a rear side having a first stopper face perpendicular to the longitudinal axis, and wherein the second positioning groove includes a rear side having a second inclined guiding face inclining rearward.

3. The driving rod assembly for a power tool as claimed in claim 2, wherein the rod further includes a flange between the first coupling groove and the insertion section, wherein the flange has a diameter larger than a diameter of the operative section, and wherein the rear end of the jacket abuts the flange when the C-clip is in the rear position and is located in the first positioning groove.

4. The driving rod assembly for a power tool as claimed in claim 1, wherein each of the first positioning groove and the second positioning groove of the rod includes a bottom wall having a diameter smaller than a diameter of the operative section of the rod.

5. The driving rod assembly for a power tool as claimed in claim 1, wherein the jacket further includes a third inclined guiding face extending from behind the coupling groove to the rear end of the receiving section and having increasing diameters toward the rear end of the receiving section.

6. The driving rod assembly for a power tool as claimed in claim 1, wherein the coupling end of the rod has a diameter smaller than a diameter of the coupling portion of the rod, and wherein a magnetic element is mounted in the coupling end.

7. The driving rod assembly for a power tool as claimed in claim 1, wherein the positioning portion of the rod is cylindrical.

\* \* \* \* \*